United States Patent
Umeda et al.

(10) Patent No.: US 8,290,259 B2
(45) Date of Patent: Oct. 16, 2012

(54) DEVICE ADAPTIVELY SWITCHING COLOR EMPHASIS PROCESSING FOR IMAGE

(75) Inventors: Kiyoshi Umeda, Kawasaki (JP); Ryosuke Iguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 971 days.

(21) Appl. No.: 12/181,903

(22) Filed: Jul. 29, 2008

(65) Prior Publication Data

US 2009/0034838 A1    Feb. 5, 2009

(30) Foreign Application Priority Data

Jul. 31, 2007    (JP) .................................. 2007-199491

(51) Int. Cl.
G06K 9/00 (2006.01)
G06K 9/40 (2006.01)
G03F 3/08 (2006.01)

(52) U.S. Cl. .......................... 382/167; 358/518; 382/274

(58) Field of Classification Search .................. 382/118, 382/162, 166, 167, 254, 274, 275, 305, 312; 348/223.1; 358/1.9, 2.1, 516, 518, 520, 521; 345/589, 593
See application file for complete search history.

(56) References Cited

U.S. PATENT DOCUMENTS

| | | | |
|---|---|---|---|
| 6,097,501 A * | 8/2000 | Hayashi et al. | 358/1.9 |
| 6,603,878 B1 | 8/2003 | Takemoto | 382/167 |
| 6,814,420 B2 | 11/2004 | Fujita et al. | 347/15 |
| 6,870,637 B1 * | 3/2005 | Watanabe | 358/1.9 |
| 6,917,444 B1 * | 7/2005 | Moriwaki | 358/1.9 |
| 7,079,152 B2 | 7/2006 | Akiyama et al. | 345/589 |
| 7,251,361 B2 * | 7/2007 | Gruzdev et al. | 382/167 |
| 7,266,239 B2 | 9/2007 | Akiyama et al. | 382/167 |
| 7,468,812 B2 * | 12/2008 | Fukuda | 358/1.9 |
| 7,548,357 B2 * | 6/2009 | Moriya | 358/520 |
| 7,616,233 B2 * | 11/2009 | Steinberg et al. | 348/222.1 |
| 7,653,246 B2 * | 1/2010 | Hibi et al. | 382/195 |
| 7,663,788 B2 * | 2/2010 | Kameyama | 358/518 |
| 7,679,786 B2 * | 3/2010 | Scott et al. | 358/2.1 |
| 7,844,076 B2 * | 11/2010 | Corcoran et al. | 382/103 |
| 7,869,649 B2 * | 1/2011 | Watanabe et al. | 382/162 |
| 7,916,158 B2 * | 3/2011 | Aoki et al. | 345/690 |
| 2006/0215034 A1 | 9/2006 | Nakabayashi et al. | |
| 2007/0047019 A1 | 3/2007 | Toyoda | 358/448 |

(Continued)

FOREIGN PATENT DOCUMENTS

CN    1768535    5/2006

(Continued)

OTHER PUBLICATIONS

Chinese Office Action dated Mar. 1, 2010 in CN 200810144474.8.

(Continued)

*Primary Examiner* — Kanjibhai Patel
(74) *Attorney, Agent, or Firm* — Fitzpatrick, Cella, Harper & Scinto

(57) ABSTRACT

The present invention provides an image processing device which adaptively switches between emphasis of a specified color in an image and emphasis of the entire image. The image processing device of the present invention includes: a storage unit storing a plurality of color emphasis tables for emphasizing a specified color; a calculation unit calculating magnitudes of respective color emphasis effects when the plurality of color emphasis tables stored by the storage unit is applied to the image; a selection unit selecting one or more color emphasis tables according to the magnitudes of the color emphasis effects; and a correction unit correcting the specified color in the image by applying the color emphasis tables selected by the selection unit to the image.

6 Claims, 18 Drawing Sheets

U.S. PATENT DOCUMENTS

2007/0146752 A1  6/2007  Iguchi .......................... 358/1.9

FOREIGN PATENT DOCUMENTS

| JP | 11-275363 | 10/1999 |
| JP | 2002-44469 | 2/2002 |
| JP | 2004-201224 | 7/2004 |
| JP | 2006-217277 | 8/2006 |
| JP | 2006-293898 | 10/2006 |
| JP | 2007-67815 | 3/2007 |

OTHER PUBLICATIONS

Office Action dated Sep. 22, 2011 in corresponding Japanese Application No. 2007-199491.

* cited by examiner

DEVICE ADAPTIVELY SWITCHING COLOR EMPHASIS PROCESSING FOR IMAGE

BACKGROUND OF THE INVENTION

1. Field of the Invention

The present invention relates to a device for extracting a specified color from an input image and correcting the extracted color, and, in particular, relates to a device that adaptively switching color emphasis processing for the input image.

2. Description of the Related Art

A technique exists for extracting a desired color region from within an image photographed by a digital camera or the like and correcting the color region. For example, Japanese Patent Laid-Open No. 2004-201224 discloses a technique to divide an image into a plurality of regions and to perform processing to emphasize a different color for each region when automatically identifying a color to be emphasized in the image and performing the emphasis processing. Further, Japanese Patent Laid-Open No. 11-275363 discloses a technique to perform gradation hardening process on image data obtained by scanning a color negative film and to perform processing to convert a specified hue (e.g., cyan for sky blue) into a desired hue on the image data subjected to the gradation hardening process.

When an image photographed with a digital camera or the like is a landscape photograph including a person and the image has a color cast caused by any effect of a light source, a face color of the person within the image is not a favorable color. When color balance is accordingly adjusted for this image by publicly known white balance correction, the face color of the person changes to a favorable color. However, if further processing is conducted to emphasize saturation of the entire image so as to brighten a background color of the person (sky, mountain, or the like), the face color, which was successfully improved by the above color balance adjustment, is changed. Accordingly, it is desired to only brighten the background of a person while keeping the favorable face color. A technique to extract a specified color, except for the face color of the person, from the image data and to emphasize only the specified color, as described above, is effective for such a case. On the other hand, for a landscape photograph without a person, it is possible to form a favorable image by emphasizing saturation of the entire image and therefore it is not necessary to emphasize only a specified color of the background.

Further, the conventional techniques generally require two parameters for performing the emphasis processing by extracting an arbitrary hue from within an image. One is a parameter defining a desired hue range and the other is a modification parameter for how to modify the hue. The technique disclosed in Japanese Patent Laid-Open No. 11-275363 uses a parameter preliminarily defining the hue range of the sky-blue (cyan) to be extracted and a parameter (emphasis function F) of how to emphasize the color, and achieves the emphasis processing of a specified color by a combination of these parameters. However, if two parameters are required for performing single processing, it is necessary to design both parameters and to store both parameters in a memory. In addition, if two parameters exist, even when only one of the two is desired to be changed, the other parameter should be changed so as to avoid inconsistency of the two parameters and a problem arises that the change of the parameters is extremely troublesome.

SUMMARY OF THE INVENTION

An object of the present invention is to provide an image processing device which determines whether or not an object exists in an image (e.g., person), the color of which is desired not to be changed, and adaptively switches between emphasis of a specified color and emphasis of the entire image according to the determination result.

Further, another object of the present invention is to provide an image processing device which calculates a hue range to be changed and an application weight thereof using one parameter.

An image processing device of the present invention includes a determining unit configured to determine whether or not a predetermined object exists in an image; and a correction unit configured to correct a specified color except for a color of the predetermined object when it is determined by the determining unit that the predetermined object exists in the image, and correcting saturation of the entire image when it is determined by the determining unit that the predetermined object does not exist in the image.

An image processing device of the present invention includes a storage unit configured to store a plurality of color emphasis tables for emphasizing a specified color; a calculation unit configured to calculate magnitudes of respective color emphasis effects when the plurality of color emphasis tables stored by the storage unit is applied to an image; a selection unit configured to select one or more color emphasis tables according to the magnitudes of the color emphasis effects; and a correction unit configured to correct a specified color in the image by applying the color emphasis tables selected by the selection unit to the image.

An image processing device of the present invention includes a storage unit configured to store a plurality of color emphasis tables for emphasizing a specified color; a determining unit configured to determine whether or not a predetermined object exists in an image; a calculation unit configured to calculate magnitudes of respective color emphasis effects when the plurality of color emphasis tables stored by the storage unit is applied to the image; a selection unit configured to select one or more color emphasis tables according to the magnitudes of the color emphasis effects; a calculation unit configured to calculate weight, in which the color emphasis tables selected by the selection unit are applied to the image; and a correction unit configured to correct a specified color except for a color of the predetermined object by applying the color emphasis tables selected by the selection unit to the specified color in the weight; when the determining unit determines that the predetermined object exists in the image, and correcting saturation of the entire image when the determining unit determines that the predetermined object does not exist in the image.

An image processing method of the present invention, includes the steps of determining whether or not a predetermined object exists in an image; and correcting a specified color except for a color of the predetermined object when it is determined by the determining step that the predetermined object exists in the image and correcting saturation of the entire image when it is determined by the determining step that the predetermined object does not exist in the image.

An image processing method of the present invention includes the steps of storing a plurality of color emphasis tables for emphasizing a specified color; calculating magnitudes of respective color emphasis effects when the plurality of color emphasis tables stored by the storing step is applied to an image; selecting one or more color emphasis tables according to the magnitudes of the color emphasis effects; and correcting a specified color in the image by applying the color emphasis tables selected by the selection step to the image.

A computer-readable recording medium of the present invention records a program for causing a computer to execute the above methods.

According to the present invention, adaptively switching the color emphasis processing for an input image is possible.

Further features of the present invention will become apparent from the following description of exemplary embodiments (with reference to the attached drawings).

DESCRIPTION OF THE EMBODIMENTS

Hereinafter, embodiments of the present invention will be described with reference to the drawings.

First Embodiment

Figure 1:
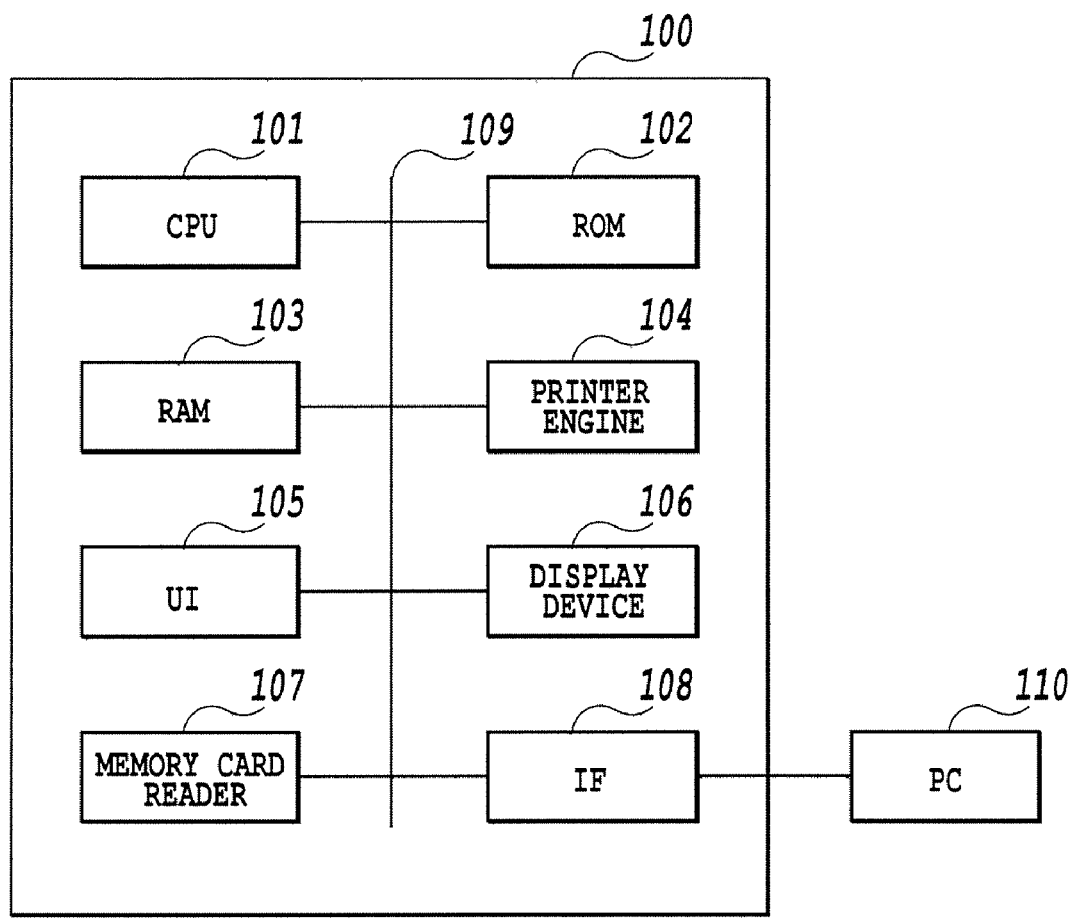
FIG. 1 is a block diagram showing a configuration example of an image processing device to which the present invention can be applied.

FIG. 1 is a block diagram showing a configuration example of an image processing device, to which the present invention can be applied.

An image processing device 100 includes a CPU 101, a ROM 102, a RAM 103, a printer engine 104, a user interface 105 such as a touch panel, a display device 106, a memory card reader 107, and a input/output interface 108. These elements are connected via a system bus 109. The image processing device 100 can be connected with a personal computer (PC) 110 via the input/output interface 108. This device can be incorporated in a printer, a digital camera, a copy machine, a facsimile, a TV, etc.

The CPU 101 loads a program (including an image processing program described below) stored in the ROM 102 into the RAM 103, which is a work memory, and executes the program. Then, the CPU 101 controls the above each element via the system bus 109 according to the program and realizes a function of the program.

Figure 2:
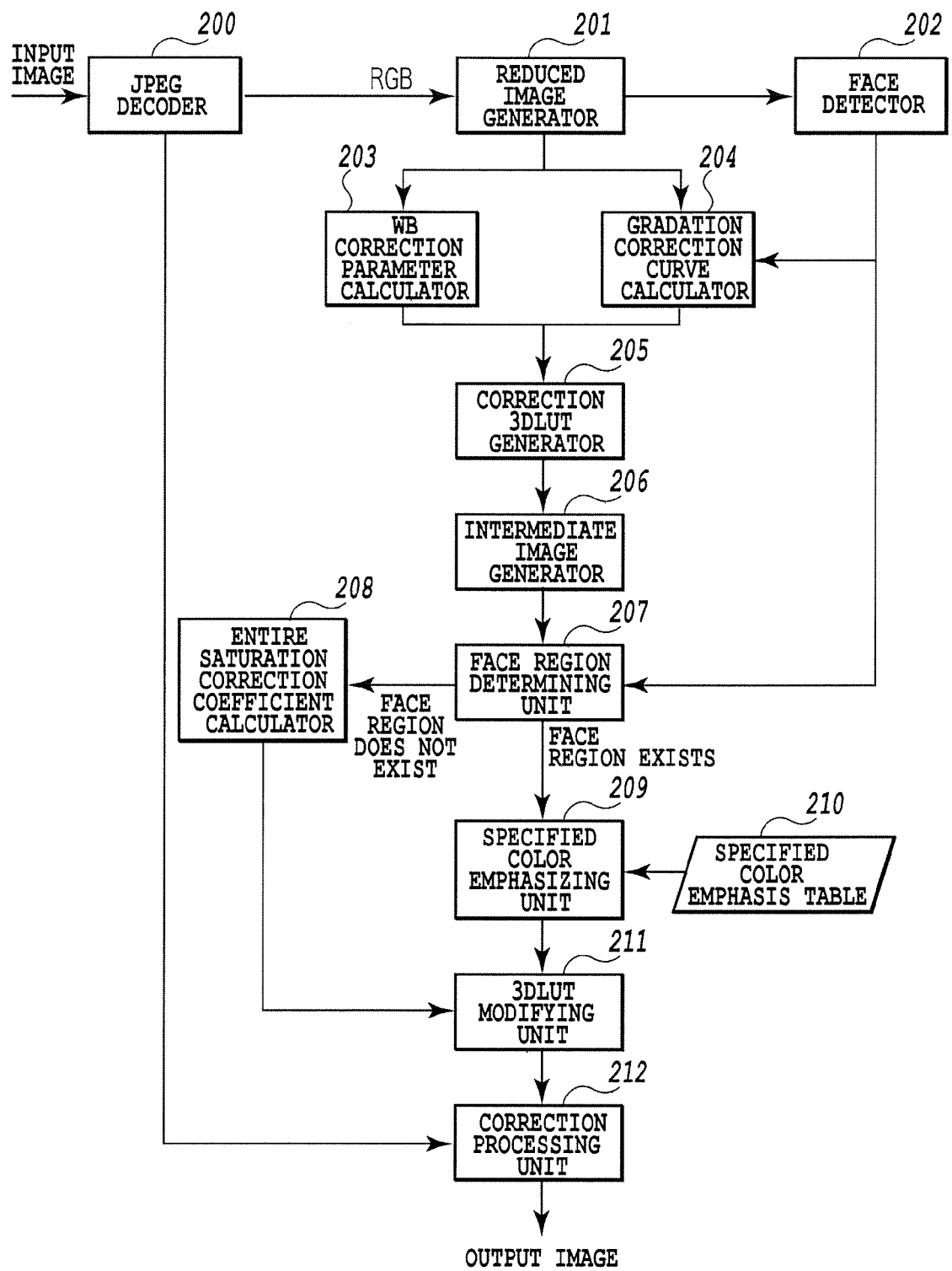
FIG. 2 is a block diagram showing a function of an image processing device in a first embodiment.

FIG. 2 is a block diagram showing a function of the image processing device in the first embodiment and showing the processing executed by the CPU 101.

A JPEG decoder 200 receives still image information (Exif-JPEG information or the like) of a still image photographed by a digital camera or the like, and generates image data (e.g., R G B data (24 bit gradation)) by performing publicly known JPEG decode processing on the still image data.

A reduced image generator 201 generates reduced image data from the image data received from the JPEG decoder 200. The purpose of the reduced image data generation is to reduce an amount of computation required for image analysis such as a face detection processing or calculation of a white balance parameter which is described hereinafter. The reduced image data needs to be as small as possible and also to store sufficient details of the image. Accordingly, a resolution of the reduced image data is preferably around 640×480 pixels. In the first embodiment, the reduced image generator 201 is assumed to generate reduced image data composed of R G B data (24 bit gradation).

A face detector 202 performs processing to detect a face region of a person, as a predetermined object, on the reduced image data received from the reduced image generator 201, and obtains a face detection result indicating a coordinate position of the detected face region and the like. The face detection processing may be performed by use of a well known method.

A white balance correction parameter calculator 203 estimates a state of the white balance (WB) of the reduced image data received from the reduced image generator 201 and obtains a correction parameter for an appropriate white balance. This parameter is referred to as a white balance correction parameter. While the white balance correction method may be any publicly known method, the first embodiment uses a correction method having a bright region and a dark region of the image. The bright region of the image is referred to as a highlight (HL) region and the dark region of the image is referred to as a shadow (SD) region.

Figure 3:
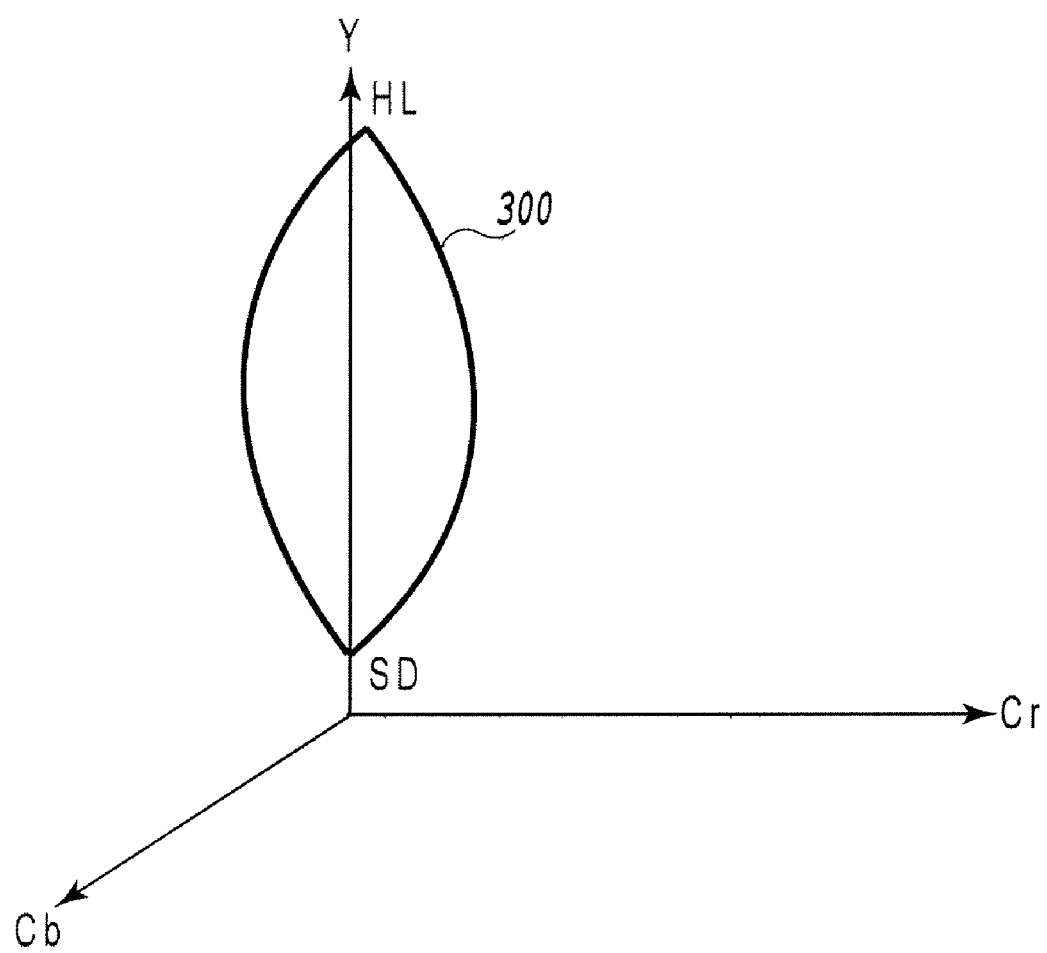
FIG. 3 is a diagram for illustrating a correction method of the white balance.
Figure 4:
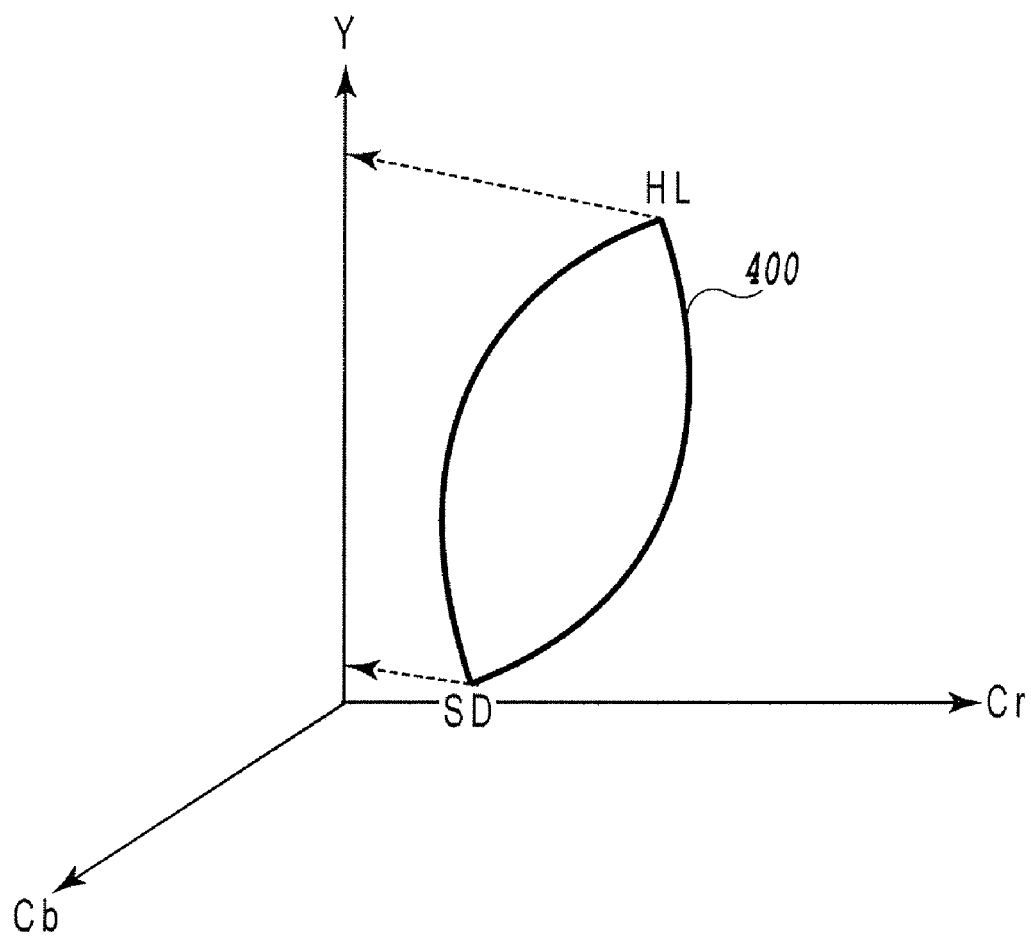
FIG. 4 is a diagram for illustrating a correction method of the white balance.

FIG. 3 and FIG. 4 are diagrams for illustrating a correction method of the white balance.

When an input image has an appropriate white balance, as indicated by Reference numeral 300 in FIG. 3, it is known that the highlight (HL) region and the shadow (SD) region are distributed around the gray axis (Y axis), when the input image is projected into a luminance-color difference space (Y Cb Cr space). On the other hand, when the white balance is broken such as when the input image has a color cast, the distribution of the image in the luminance-color difference space is indicated by Reference numeral 400 in FIG. 4. For performing the white balance correction for an input image having the distribution indicated by Reference numeral 400 in FIG. 4, a rotation matrix is generated for disposing the highlight (HL) region and the shadow (SD) region on the gray axis (Y axis) in the luminance-color difference space. Then, a color conversion in the luminance-color difference space is performed by the following formula.

$$\begin{bmatrix} Y' \\ Cb' \\ Cr' \end{bmatrix} = \begin{bmatrix} m_{00} & m_{01} & m_{02} \\ m_{10} & m_{11} & m_{12} \\ m_{20} & m_{21} & m_{22} \end{bmatrix} \begin{bmatrix} Y \\ Cb \\ Cr \end{bmatrix}$$

The 3×3 rotation matrix in the above formula is a parameter of the white balance correction.

Figure 5:
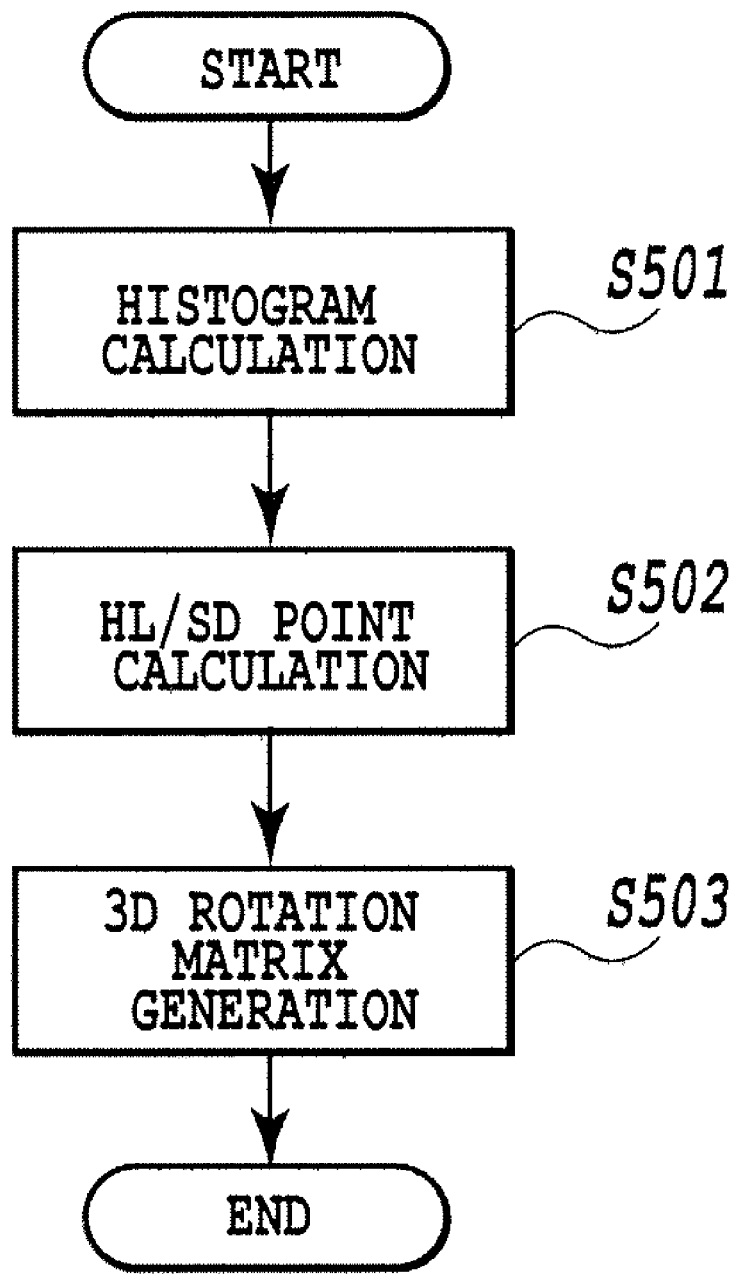
FIG. 5 is a flowchart showing a flow of calculation processing for a white balance correction parameter.

FIG. 5 is a flowchart showing the flow of the calculation processing for the white balance correction parameter by the white balance correction parameter calculator 203.

In S501, the white balance correction parameter calculator 203 calculates a histogram of the reduced image data. For calculating the histogram, a pixel value of the reduced image data composed of R G B data is converted into Y Cb Cr value, and an accumulated luminance histogram and average Cb and Cr values at each luminance value are calculated.

In S502, the white balance correction parameter calculator 203 calculates a highlight point (HL point) and a shadow point (SD point). For example, the white balance correction parameter calculator 203 refers to the accumulated luminance histogram and determines points where the accumulated frequency is 99.0% and 1.0% of the entire reduced image data to be the highlight point and the shadow point, respectively. The highlight point is denoted by ($Y^{HL}$, $Cb^{HL}$, $Cr^{HL}$) and the shadow point is denoted by ($Y^{SD}$, $Cb^{SD}$, $Cr^{SD}$).

In S503, the white balance correction parameter calculator 203 generates the 3×3 rotation matrix for disposing the highlight point and the shadow point on the gray axis (Y axis). Note that the 3×3 rotation matrix may be generated by a publicly known method.

The function of the image processing device 100 will be described with reference to FIG. 2.

A gradation correction curve calculator 204 calculates a gradation correction curve according to the reduced image data received from the reduced image generator 201 and the face detection result received from the face detector 202. Various methods are available to perform the gradation correction on the input image. For example, a correction to increase contrast is considered for the input image of a landscape image. Further, a correction to make a bright region outstanding, while maintaining a dark region, can be considered for the input image of a night scene image. The first embodiment performs a gradation correction for making the luminance of the face region appropriate when the detected face region of a person is dark.

Figure 6:
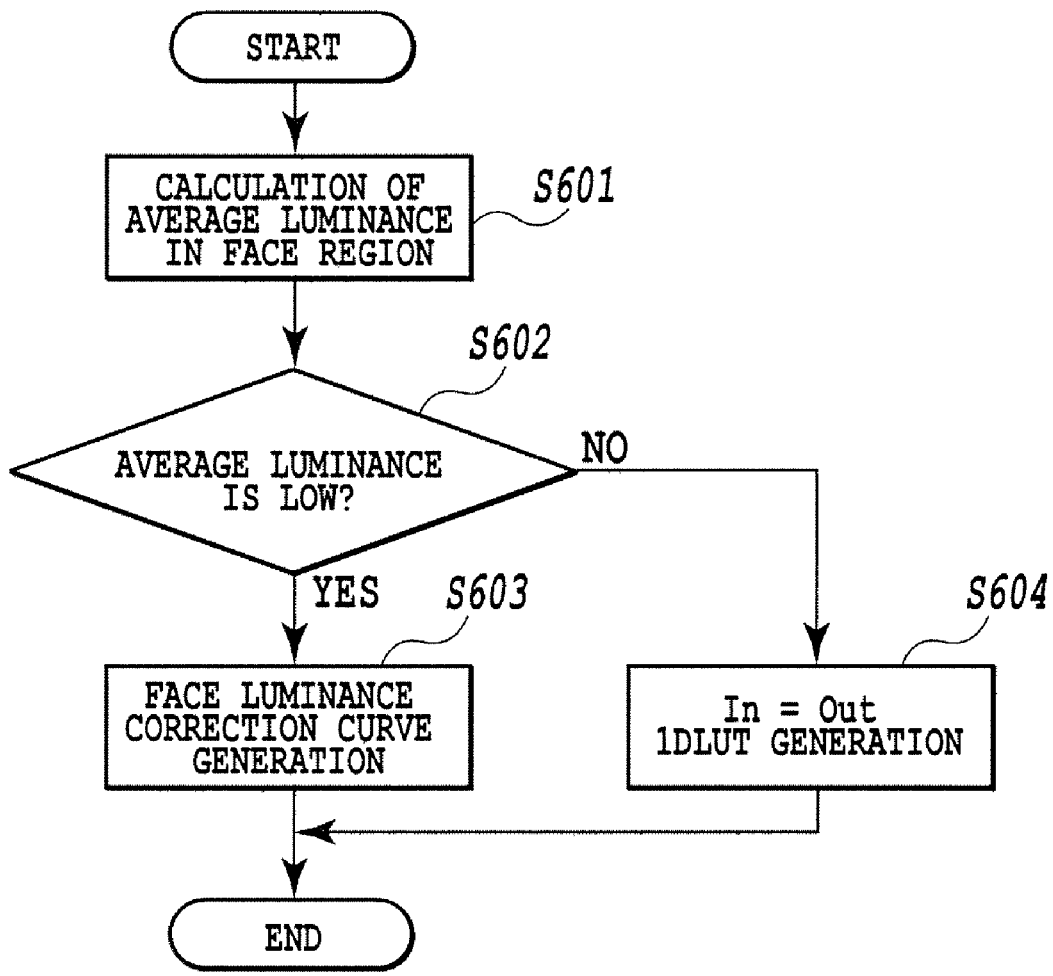
FIG. 6 is a flowchart showing a flow of gradation correction processing.

FIG. 6 is a flowchart showing a flow of the gradation correction processing by the gradation correction curve calculator 204.

In S601, the gradation correction curve calculator 204 calculates an average luminance value of the face region (InSkinTone) detected by the face detector 202. In a case there is a plurality of face regions, the gradation correction curve calculator 204 may calculate an average luminance value of each face region and then obtain an average thereof, or may obtain only an average luminance value of the large face regions.

In S602, the gradation correction curve calculator 204 determines whether or not the average luminance value of the face region (InSkinTone) obtained in S601 is lower than a predetermined value. That is, the gradation correction curve calculator 204 determines whether the face region is dark or not. When the average luminance value of the face region is lower than the predetermined value in the determination result, the gradation correction curve calculator 204 assumes that the face region is in a backlit state and generates a gradation correction curve for correcting the average luminance value (InSkinTone) into a target luminance value (OutSkinTone).

Figure 7:
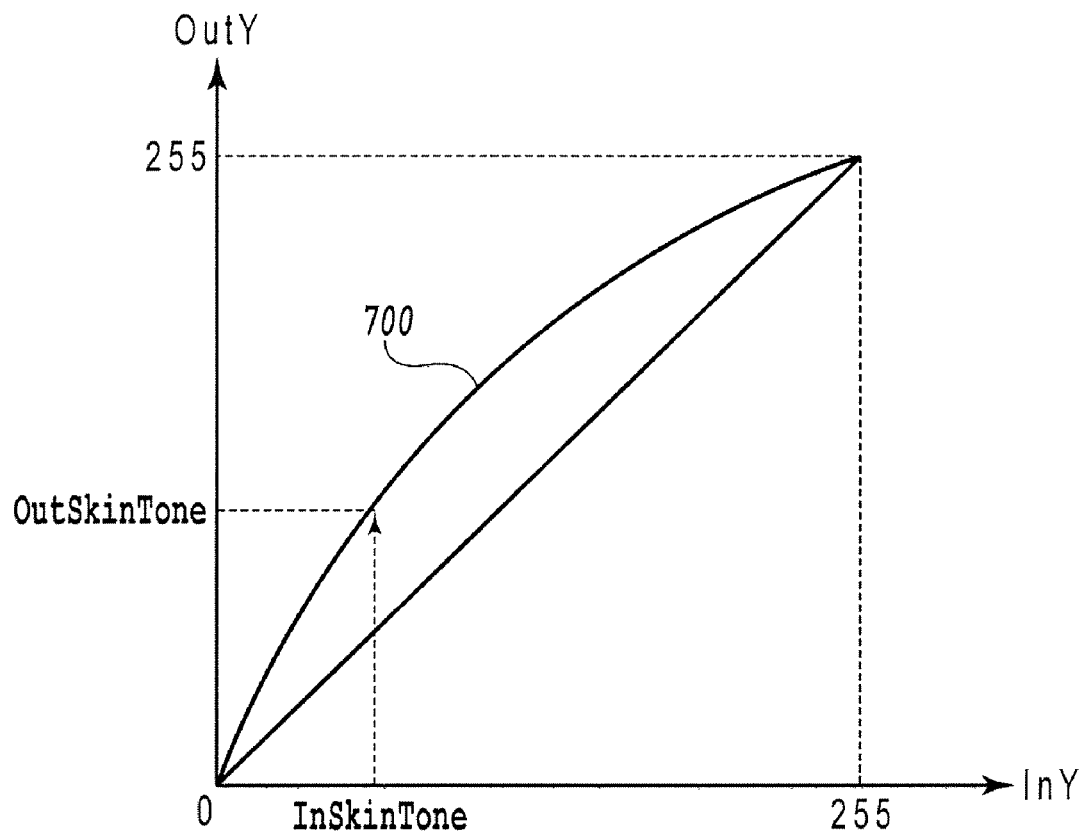
FIG. 7 is a diagram for illustrating generation of a gradation correction curve.

FIG. 7 is a diagram for illustrating the gradation correction curve generation by the gradation correction curve calculator 204.

Reference numeral 700 in FIG. 7 indicates a gradation correction curve. The gradation correction curve may be a curve going through coordinate values (0, 0), (InSkinTone, OutSkinTone), and (255, 255). That is, the gradation correction curve may be a simple gamma curve or a curve constituted by straight lines. Meanwhile, when the face region does not exist or the average luminance value of the face region is higher than a predetermined value, a one-dimensional lookup table, in which In and OUT have the same values, is generated and stored in the memory.

The function of the image processing device 100 will be described with reference to FIG. 2.

A three-dimensional correction lookup table generator 205 receives the white balance correction parameter (3×3 rotation matrix) from the white balance correction parameter calculator 203 and receives the gradation correction curve from the gradation correction curve calculator 204. The three-dimensional correction lookup table generator 205 generates an R G B three-dimensional lookup table (3DLUT) for image correction using the white balance correction parameter and the gradation correction curve.

Figure 8:
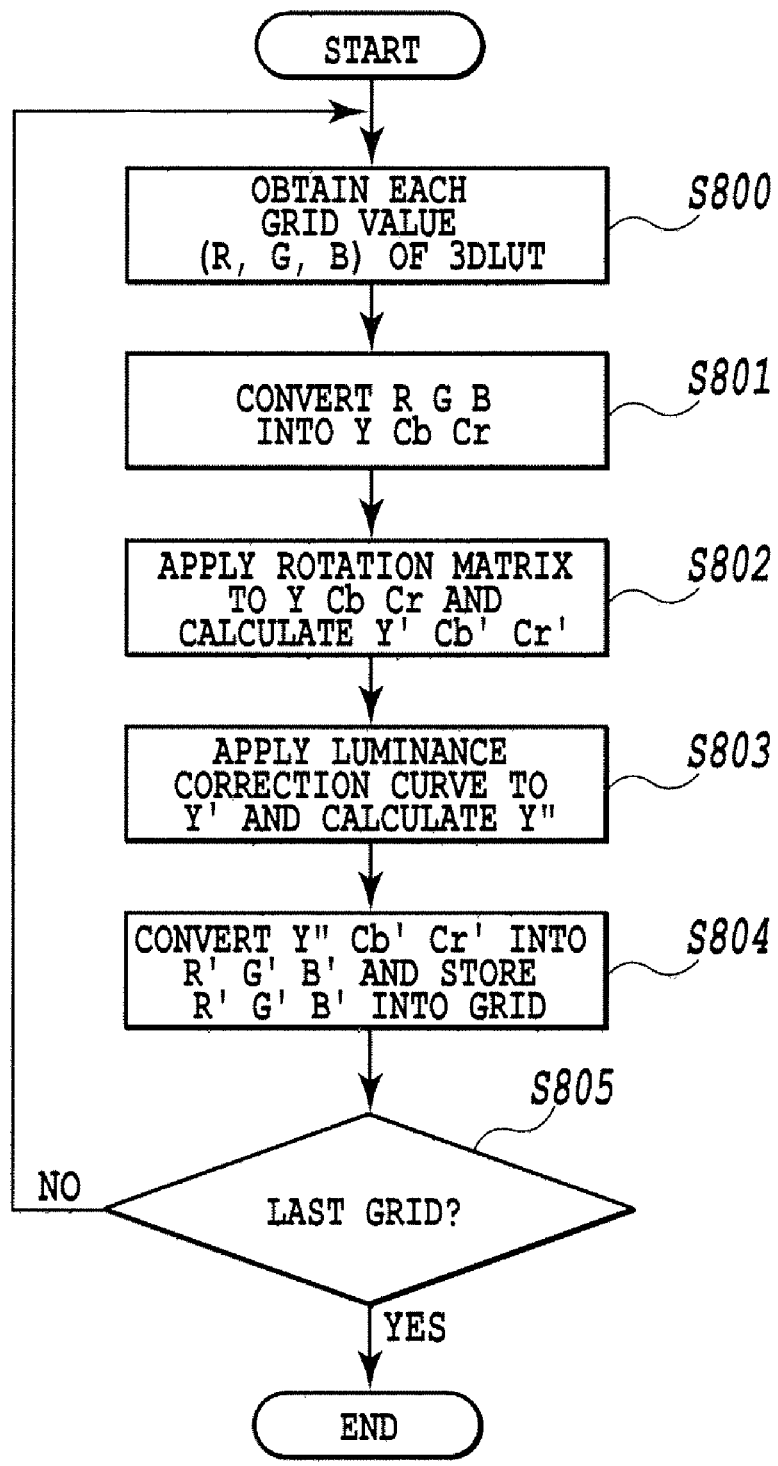
FIG. 8 is a flowchart showing a flow of generation processing for a three-dimensional correction lookup table.

FIG. 8 is a flowchart showing a generation processing flow for the three-dimensional correction lookup table by the three-dimensional correction lookup table generator 205.

In S800, the three-dimensional correction lookup table generator 205 obtains each grid value (R, G, B) of the three-dimensional correction lookup table in the R G B space.

In S801, the three-dimensional correction lookup table generator 2005 converts the grid value (R, G, B) into Y Cb Cr value of the luminance-color difference signal.

In S802, the three-dimensional correction lookup table generator 205 applies the white balance correction parameter (3×3 rotation matrix) to the Y Cb Cr value and calculates (Y', Cb', Cr').

In S803, the three-dimensional correction lookup table generator 205 calculates a Y" value by applying the gradation correction curve to the luminance component (Y') in (Y', Cb', Cr').

In S804, the three-dimensional correction lookup table generator 205 converts (Y", Cb', Cr') into (R', G', B') and stores the converted result into a grid.

The three-dimensional correction lookup table generator 205 performs the above processing for all the grids in the R G B three-dimensional correction lookup table.

In S805, when the three-dimensional correction lookup table generator 205 performs the above processing for all the grids of the R G B three-dimensional correction lookup table, the generation of the three-dimensional correction lookup table is completed.

The function of the image processing device 100 will be described with reference to FIG. 2.

An intermediate image generator 206 generates an intermediate image by applying the three-dimensional correction lookup table received from the three-dimensional correction lookup table generator 205 to the reduced image using a publicly known interpolation processing (tetrahedral interpolation or the like). The intermediate image generator 206 then stores the generated intermediate image data in the memory.

A face region determining unit 207 determines whether or not a face region of a person (predetermined object) exists in the reduced image data according to the face detection result received from the face detector 202. The face region determining unit 207 sends the intermediate image data received from the intermediate image generator 206 to a specified color emphasizing unit 209, if the face region exists, and sends the intermediate image data to an entire saturation correction coefficient calculator 208, if the face region does not exist. When it is determined by the face region determination unit 207 that a face region exists in the reduced image data, it is not preferable to further correct the color of the face region because the face region has already been corrected properly by the gradation correction curve calculator 204. Accordingly, when it is determined by the face region determination unit 207 that a face region exists in the reduced image data, the specified color emphasizing unit 209 performs the processing of emphasizing a specified color except for a color of the predetermined object. On the other hand, when it is determined by the face region determination unit 207 that a face region does not exist in the reduced image data, the saturation of the entire image is emphasized.

The specified color emphasizing unit 209, while keeping the color for a predetermined object color (in this example, face color), performs processing to emphasize the color for a specified color within an object except for the predetermined object. In the first embodiment, the specified color emphasizing unit 209, while referring to a plurality of specified color emphasis tables 210 stored preliminarily, determines which specified color emphasis table is applied in what degree of weight. Note that the first embodiment assumes that the specified color emphasis table is stored in the same format as that of the R G B three-dimensional correction lookup table, and stores an R G B value corrected into a specified direction at the grid of a specified color. In the first embodiment, the color of the predetermined object (in this example, face color) can be maintained by not selecting a face color emphasis table as the specified color emphasis table.

Figure 10:
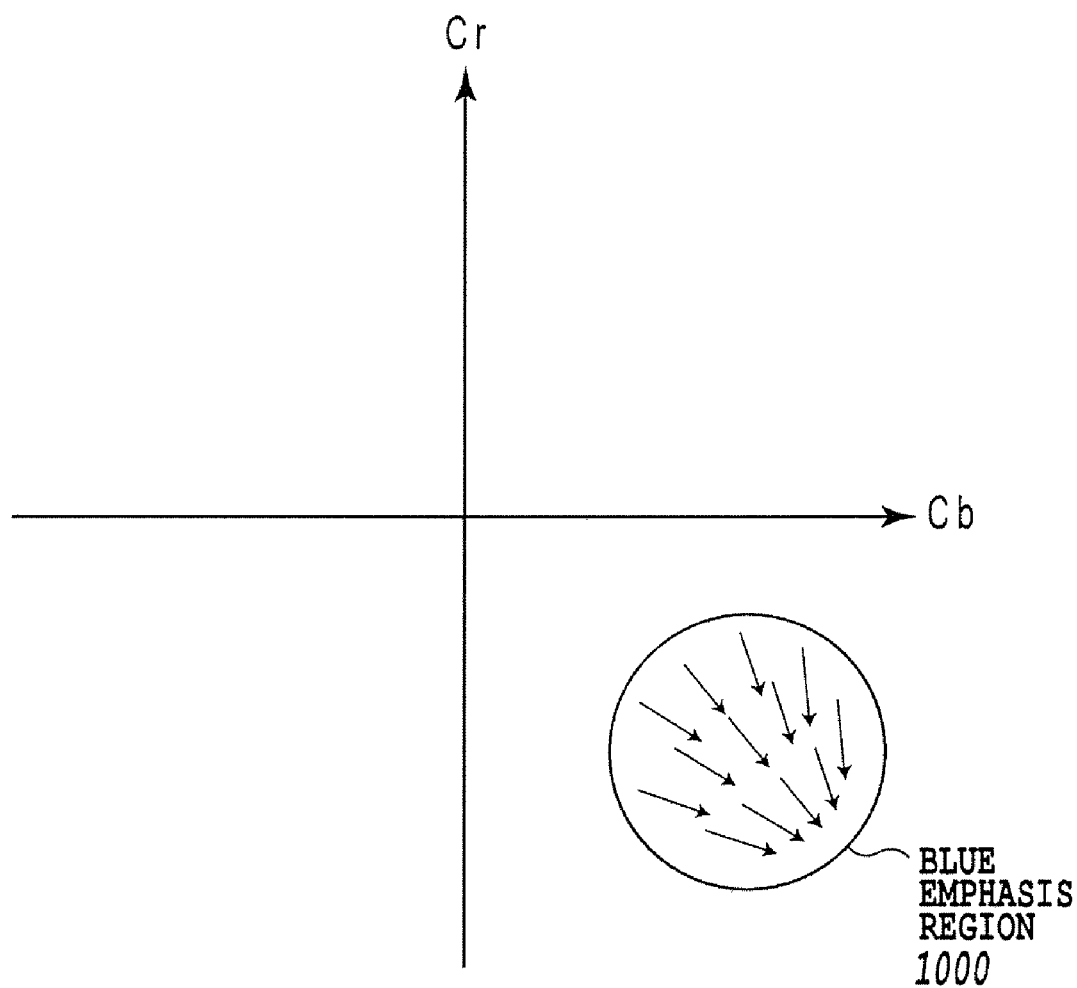
FIG. 10 is a diagram for illustrating a characteristic of a blue emphasis table.
Figure 11:
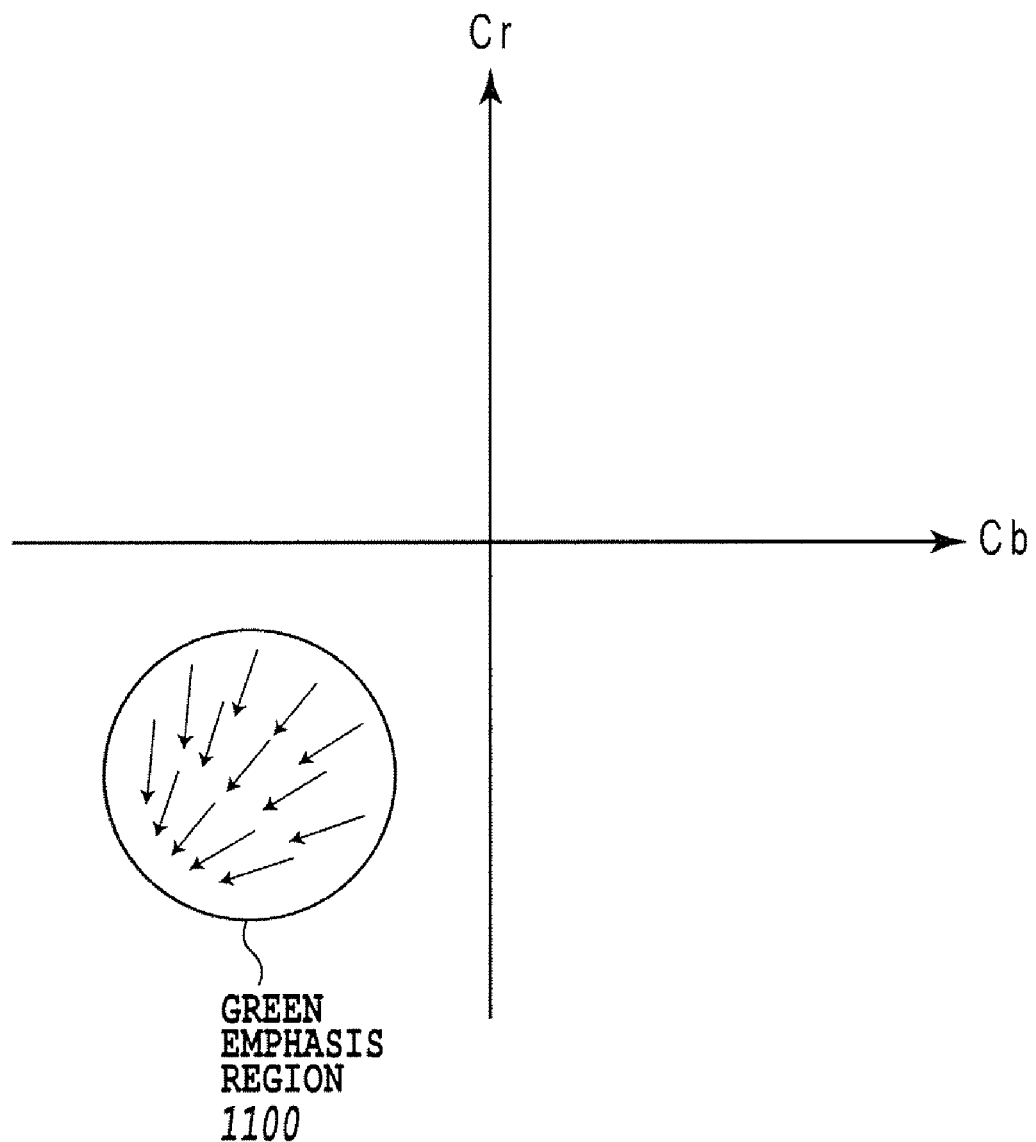
FIG. 11 is a diagram for illustrating a characteristic of a green emphasis table.

FIG. 10 is a diagram for illustrating a characteristic of a blue emphasis table which is one of the specified color emphasis tables. FIG. 11 is a diagram for illustrating a characteristic of a green emphasis table which is one of the specified color emphasis tables.

These diagrams express an effect of the specified color emphasis tables, stored in the R G B space, on a color difference Cb-Cr plane for explaining the characteristic of the specified color emphasis table in an understandable manner.

In FIG. 10, a circle 1000 shows a blue region in the color difference Cb-Cr plane. An arrow in the circle indicates a direction in which a color within the region is corrected by the blue emphasis table. Basically, the color is corrected in a direction which departs from the origin, that is, a direction toward which saturation thereof is improved, while a hue thereof is changed at the same time. Meanwhile, in a region outside the circle, a color does not change at all.

In FIG. 11, a circle 1100 shows a green region on the Cb-Cr plane. An arrow in the circle indicates a direction in which a color within the region is corrected by the green emphasis table. Basically, the color is corrected in a direction which departs from the origin, that is, a direction toward which saturation thereof is improved, while a hue thereof is changed at the same time. Meanwhile, in a region outside the circle, a color does not change at all.

The specified color emphasizing unit 209 stores a plurality of such specified color emphasis tables, and selects the most appropriate specified color emphasis table therefrom according to the input image as described below.

Figure 9:
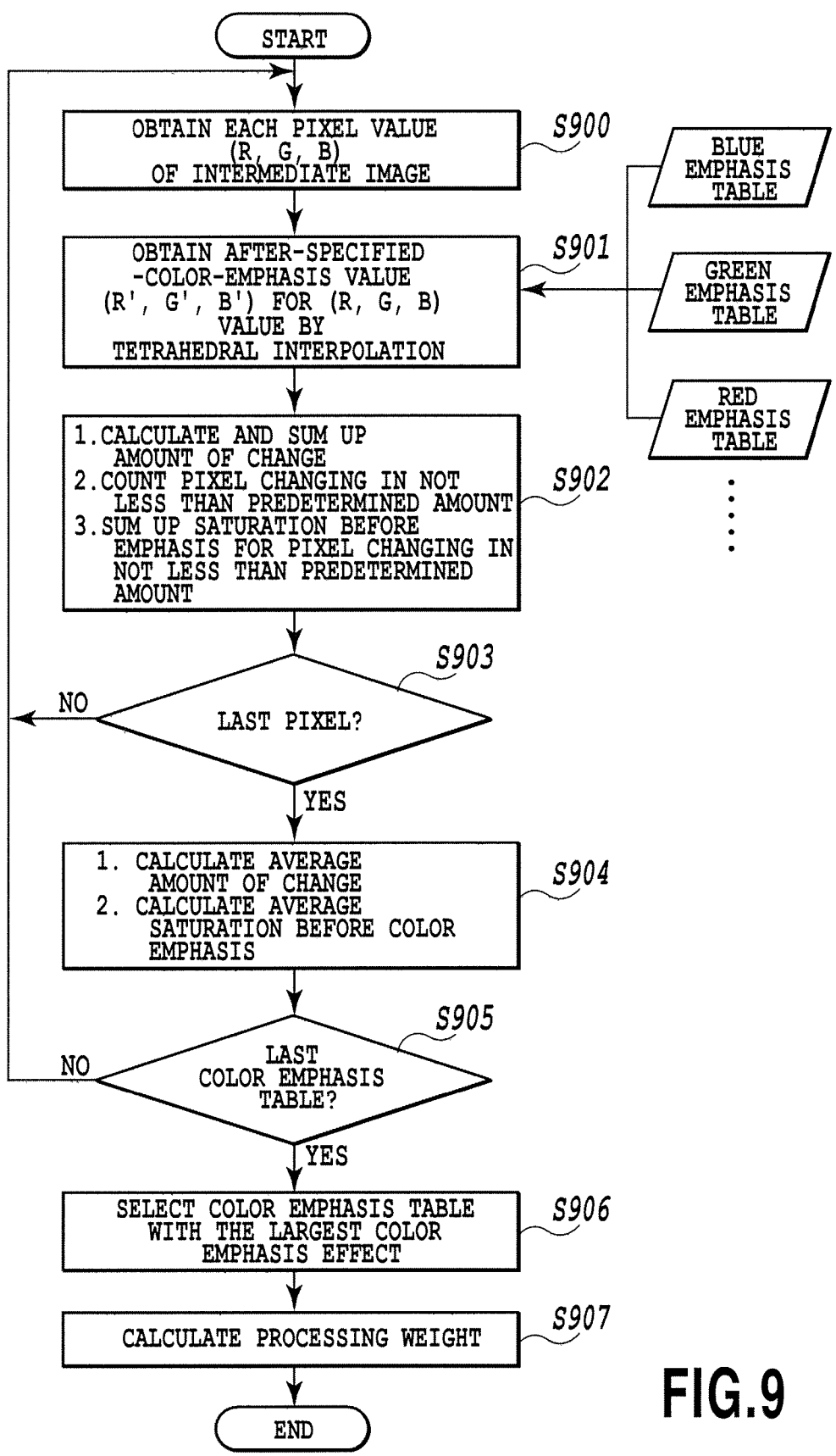
FIG. 9 is a flowchart showing a flow of specified color emphasis processing in the first embodiment.

FIG. 9 is a flowchart showing a flow of processing to select the most appropriate specified color emphasis table and to determine application weight of the selected specified color emphasis table in the specified color emphasizing unit 209.

In S900, the specified color emphasizing unit 209 obtains a pixel value (R, G, B) of the intermediate image data received from the intermediate image generator 206.

In S901, the specified color emphasizing unit 209 selects the blue emphasis table, for example, among the plurality of specified color emphasis tables (blue emphasis table, green emphasis table, red emphasis table, etc.). Then, the specified color emphasizing unit 209 applies the blue emphasis table to the pixel value (R, G, B) using a publicly known interpolation method (tetrahedral interpolation or the like). By the application of the blue emphasis table for the pixel value (R, G, B), a pixel value (R', G', B'), in which the blue is emphasized, is obtained.

In S902, the specified color emphasizing unit 209 calculates the amount of change, ΔD, in the pixel values before and after the color emphasis table application, from the pixel value (R, G, B) and the pixel value (R', G', B').

$$\Delta D = \sqrt{(R-R')^2 + (G-G')^2 + (B-B')^2}$$

In S902, the specified color emphasizing unit 209 sums the above amount of change. In addition, the specified color emphasizing unit 209 counts the number of pixels which have the amount of change equal to or larger than a predetermined value. Further, the specified color emphasizing unit 209 sums a saturation value of the pixel, which has the amount of change equal to or larger than the predetermined value, before the color emphasis. Note that the saturation of a pixel may be obtained by converting a value (R, G, B) into a value in the HIS system, or the (R, G, B) value may be converted into a (Y, Cb, Cr) value and a length of a (Cb, Cr) vector may be summed up as a saturation value as follows.

$$S = \sqrt{(Cb)^2 + (Cr)^2}$$

By eliminating a pixel having a small amount of change from the object pixels in this manner, it is possible to estimate accurately the magnitude of the color emphasis effect in the application of the specified color emphasis table.

The specified color emphasizing unit 209 performs the processing in S900 to S902 for all the pixels in the intermediate image data.

In S903, the specified color emphasizing unit 209 determines whether the processing in S900 to S902 has been performed for all the pixels in the intermediate image data, and if performed for all the pixels, the process goes to S904.

In S904, the specified color emphasizing unit 209 calculates an average amount of change and average saturation before the color emphasis by dividing the summed-up amount of change and saturation value by the number of pixels in the intermediate image data.

The specified color emphasizing unit 209 performs the processing in S900 to S904 using all the specified color emphasis tables. Thereby, the specified color emphasizing unit 209 obtains three parameters for each specified color emphasis table; the average amount of change, the number of pixels which have the amount of change not less than the predetermined value, and the average saturation of the pixels, which have the amount of change not less than the predetermined value, before the color emphasis.

In S905, the specified color emphasizing unit 209 determines whether the processing in S900 to S904 has been performed using all the specified color emphasis tables, and if performed using all the specified color emphasis tables, the process goes to S906.

In S906, the specified color emphasizing unit 209 determines which specified color emphasis table provides a larger color emphasis effect to the image data by referring to at least one of the above three parameters. The specified color emphasizing unit 209 determines the weight of the effect using the average amount of change, for example. Since the large average amount of change means a large color emphasis effect, the specified color emphasizing unit 209 selects a specified color emphasis table which provides the largest average amount of change.

In S907, the specified color emphasizing unit 209 determines in what degree of weight to apply the selected specified color emphasis table to the image. The weight in which the specified color emphasis table is applied is determined by use of at least one of the above three parameters, for example.

First, a weight W0 for the average amount of change is determined as follows, if (Average amount of change)>TH0: W0=1.0
else: W0=(Average amount of change)/TH0 where TH0 is a threshold value for normalizing the average amount of change.

That is, when the average amount of change is larger than the threshold value, the weight is set to be one, and when the average changed value is not more than the threshold value, the weight is set to the value of the average amount of change divided by the threshold value.

Next, a value of the number of pixels, which have the amount of change of not less than the threshold value, divided by the number of all the pixels in the intermediate image data is defined to be W1.

Further, the weight W2 for the average saturation before the color emphasis is determined as follows, if (Average saturation before the color emphasis)<TH2)
W2=1.0
else: W2=TH2/(Average saturation before color emphasis)

where TH2 is a threshold value for normalizing the average saturation before the color emphasis.

That is, when the average saturation before the color emphasis is not more than the threshold value, the weight is set to be "1", and when the average saturation before the color emphasis is higher than the threshold value, the weight is set to be the value of the threshold value divided by the average saturation value before the color emphasis. Thereby, when the average saturation before the color emphasis is low, it is possible to apply the specified color emphasis table strongly, and, when the average saturation before the color emphasis is high, it is possible to prevent excessive color emphasis by applying the specified color emphasis table weakly.

By use of the above values W0, W1, and W2, weight W for applying the color emphasis table is calculated as follows.

$$W = W0 \times W1 \times W2$$

The above description explains about the processing to select a specified color emphasis table and to calculate the weight W in the application of the selected specified color emphasis table, in the specified color emphasizing unit 209.

The function of the image processing device 100 will be described with reference to FIG. 2.

A three-dimensional correction lookup table modifying unit 211 combines the three-dimensional correction lookup table generated in the three-dimensional correction lookup table generator 205 and the specified color emphasis table generated in the specified color emphasizing unit 209, in the weight obtained in the specified color emphasizing unit 209.

Figure 12:
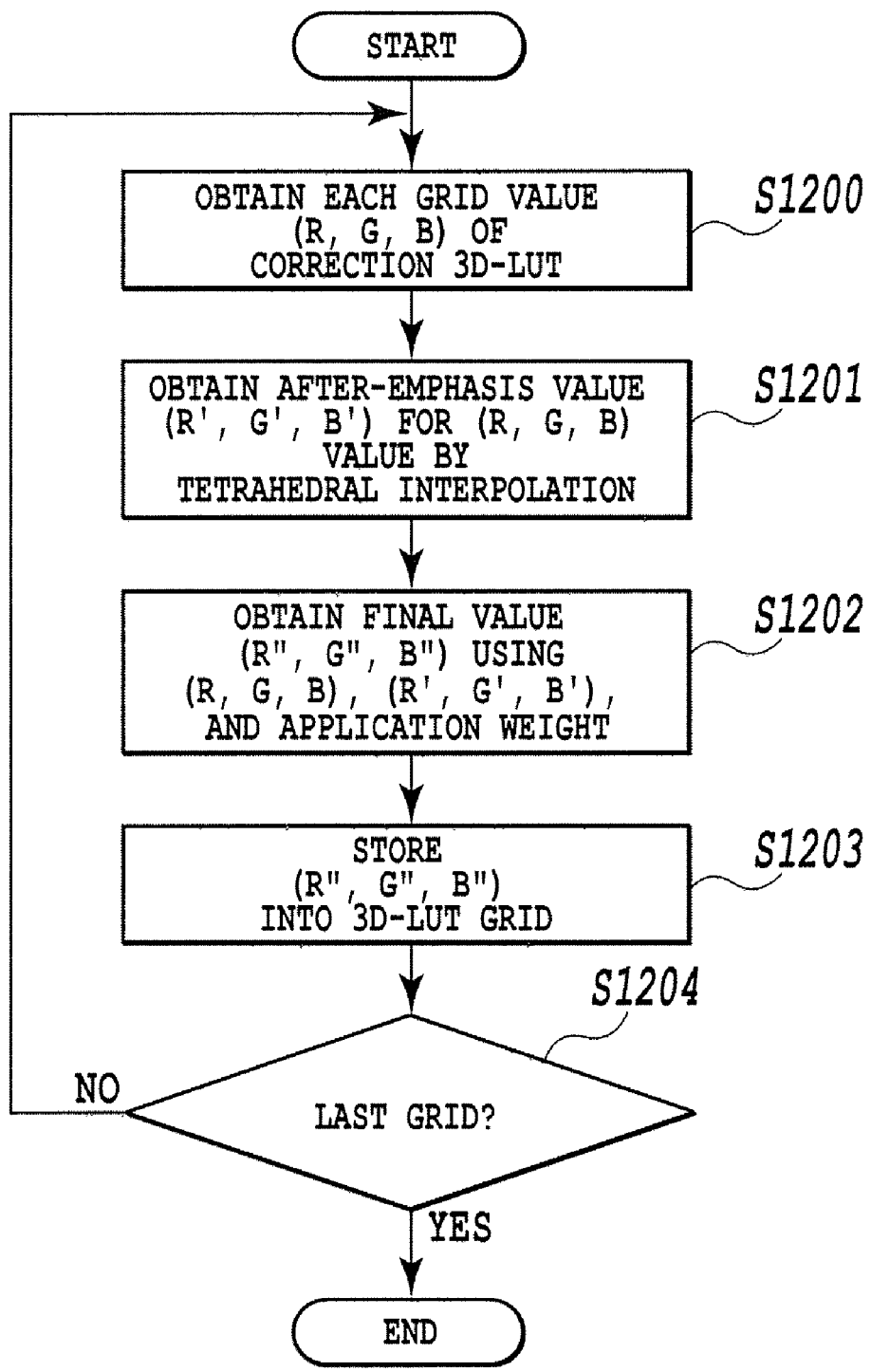
FIG. 12 is a flowchart showing a processing flow for combining a three-dimensional correction lookup table and a specified color emphasis table.

FIG. 12 is a flowchart showing a processing flow for combining the three-dimensional correction lookup table and the specified color emphasis table, in the three-dimensional correction lookup table modifying unit 211.

Note that the first embodiment assumes, for simple description, that the number of the grids in the three-dimensional correction lookup table is the same as that of the grids in the specified color emphasis table.

In S1200, the three-dimensional correction lookup table modifying unit 211 obtains the (R, G, B) value after the correction stored in an arbitrary grid of the three-dimensional correction lookup table.

In S1201, the three-dimensional correction lookup table modifying unit 211 performs the publicly known interpolation processing (tetrahedral interpolation, or the like) on (R, G, B) and calculates (R', G', B') after the color emphasis.

In S1202, the three-dimensional correction lookup table modifying unit 211 calculates a final pixel value (R", G", B") using (R, G, B), (R', G', B'), and the weight W.

$$R''=(R-R') \times W + R$$

$$G''=(G-G') \times W + G$$

$$B''=(B-B') \times W + B$$

In S1203, the three-dimensional correction lookup table modifying unit 211 stores calculated (R", G", B") into the grid of the three-dimensional correction lookup table.

The three-dimensional correction lookup table modifying unit 211 performs the processing in S1200 to S1203 for all the grids of the three-dimensional correction lookup table. Thereby, the processing to combine the three-dimensional correction lookup table and the specified color emphasis table is completed.

When it is determined that the face region does not exist in the determination by the face region determining unit 207, the face region determining unit 207 sends the intermediate image data to the entire saturation correction coefficient calculator 208.

The entire saturation correction coefficient calculator 208 calculates a saturation correction coefficient (SG) for correcting the saturation of the entire reduced image from the average saturation of the intermediate image data.

Figure 13:
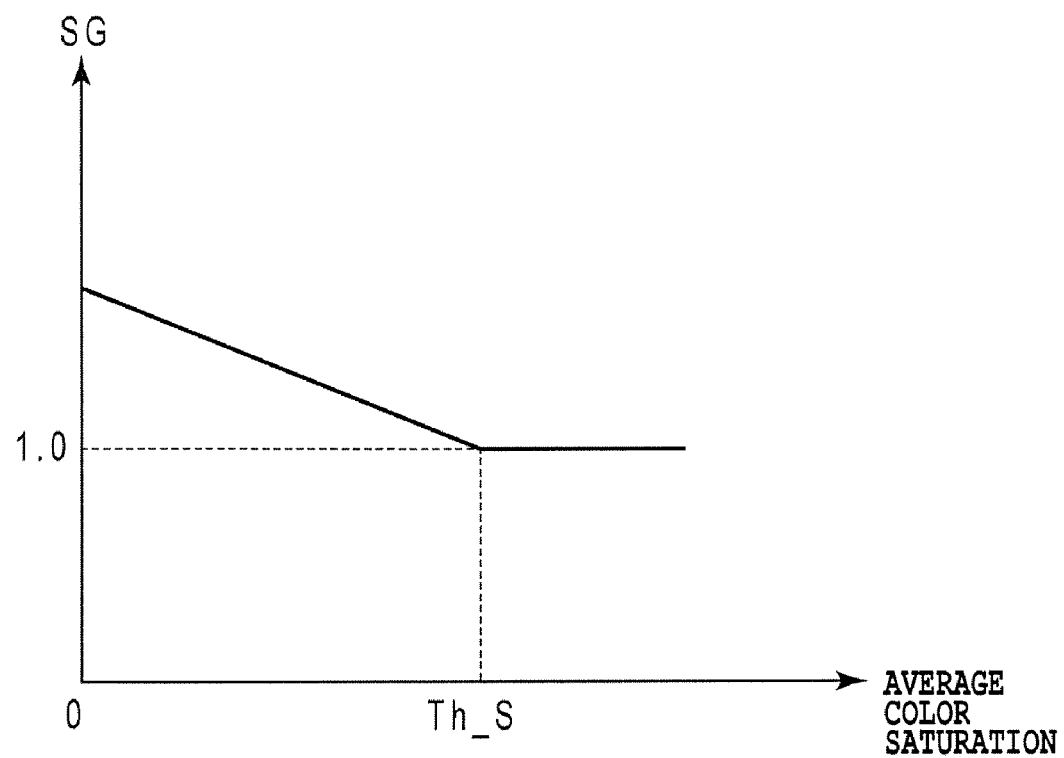
FIG. 13 is a diagram for illustrating an example of a relationship between average saturation and a saturation correction coefficient.

FIG. 13 is a diagram for illustrating an example of a relationship between the average saturation and the saturation correction coefficient.

In the graph shown in FIG. 13, the horizontal axis indicates the average saturation of the intermediate image data and the vertical axis indicates the saturation correction coefficient (SG). As apparent in this graph, the saturation correction coefficient (SG) is set to be a high value when the average saturation is low, and the saturation correction coefficient (SG) decreases as the average saturation increases and reaches a saturation correction coefficient (SG) value=1.0 where the saturation emphasis is not performed, when the average saturation has exceeded a threshold value Th_S. By setting the saturation correction coefficient (SG) in this manner, an excessive saturation emphasis is intended not to be performed for an image originally having a high saturation value.

The three-dimensional correction lookup table modifying unit 211 modifies the three-dimensional correction lookup table using the saturation correction coefficient (SG) received from entire saturation correction coefficient calculator 208.

Figure 14:
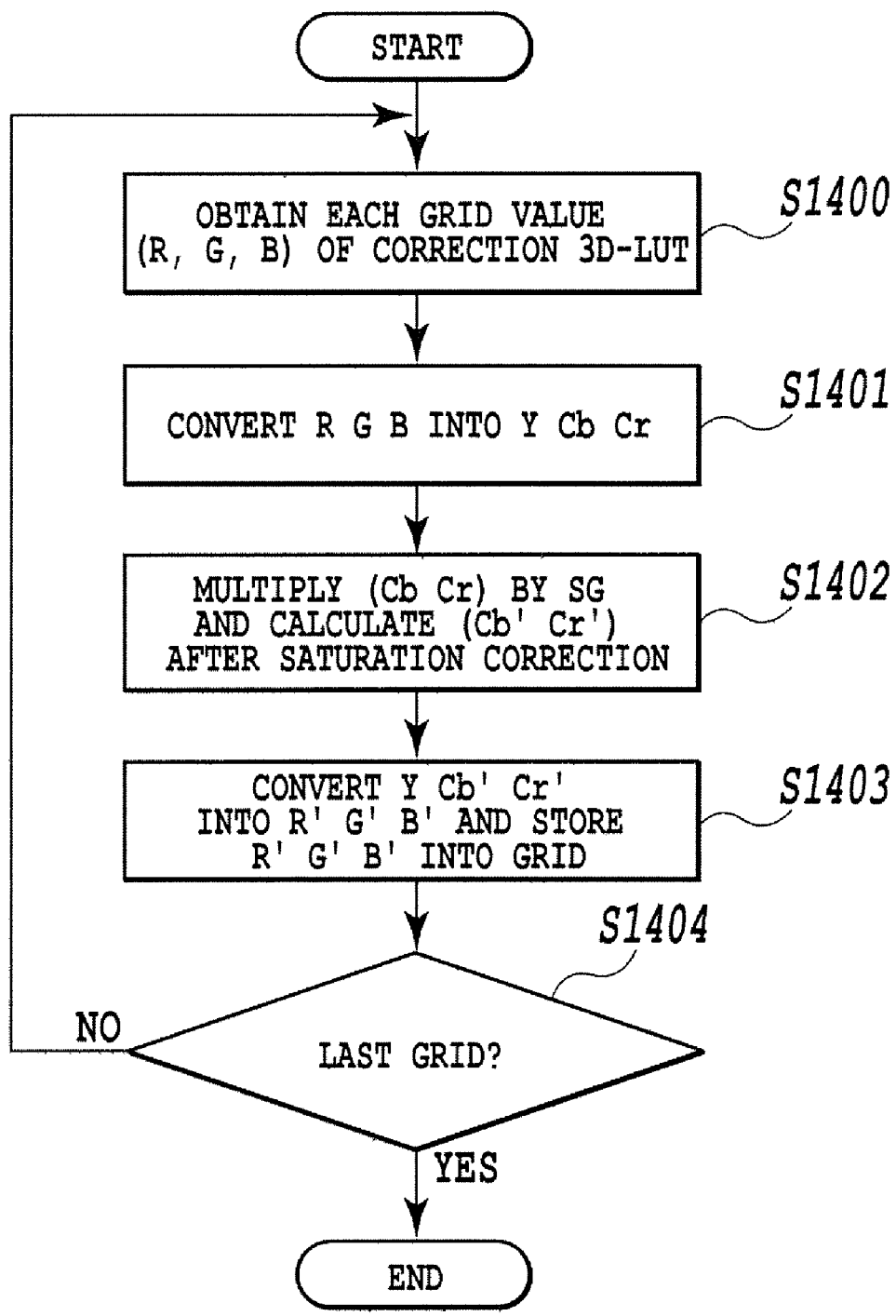
FIG. 14 is a flowchart showing a flow of modification processing for the three-dimensional correction lookup table.

FIG. 14 is a flowchart showing a flow of the modification processing for the three-dimensional correction lookup table by the three-dimensional correction lookup table modifying unit 211.

In S1400, the three-dimensional correction lookup table modifying unit 211 obtains (R, G, B) after the correction stored in an arbitrary grid in the three-dimensional correction lookup table.

In S1401, the three-dimensional correction lookup table modifying unit 211 converts (R, G, B) into (Y, Cb, Cr).

In S1402, the three-dimensional correction lookup table modifying unit 211 calculates (Cb', Cr') by multiplying (Cb, Cr) by the saturation correction coefficient (SG).

$$Cb'=Cb \times SG$$

$$Cr'=Cr \times SG$$

In S1403, the three-dimensional correction lookup table modifying unit 211 converts (Y, Cb', Cr') after the color correction into (R', G', B') and stores the converted result in the grid position.

The three-dimensional correction lookup table modifying unit 211 performs the processing in S1400 to S1403 for all the grids in the three-dimensional correction lookup table.

In S1404, the three-dimensional correction lookup table modifying unit 211 determines whether the processing in S1400 to S1403 has been performed for all the grids in the three-dimensional correction lookup table, and, if the processing has been performed for all the grids, the modification is completed.

The function of the image processing device 100 will be described with reference to FIG. 2.

A correction processing unit 212 first generates input image data having an original resolution, or a resized image reduced or enlarged into a print resolution or a display resolution, using publicly known interpolation processing. Next, the correction processing unit 212 applies the three-dimensional correction lookup table received from the three-dimensional correction lookup table modifying unit 211 to the input image and thereby generates image data subjected to a desired correction. The correction processing unit 212 stores the generated image data into the storage device, displays the generated image data on the display device, or sends the generated image data to the printer engine.

As described above, the image processing device of the first embodiment determines whether or not there exists an object, the color of which is not desired to be changed, in the input image. Thereby, if an object having a color which is not desired to be changed exists, the image processing device emphasizes only a specified color after having performed the white balance correction and the gradation correction. On the other hand, if an object, the color of which is not desired to be changed, does not exist in the input image, the image processing device emphasizes the saturation of an entire image. According to the first embodiment, it is possible to adaptively switch the color emphasis processing for the input image by performing the above processing.

In addition, the first embodiment calculates the average amount of change, that is, the magnitude of the color emphasis effect using only the specified color emphasis table preliminarily stored. Then, the first embodiment selects the most appropriate specified color table from among the plurality of specified color emphasis tables by referring to the magnitude of the color emphasis effect, and further determines weight in which the selected specified color table is applied. This configuration does not need to change algorism of the specified color emphasizing unit 209 even when the specified color emphasis table is added or modified. Note that top N color emphasis tables which have larger color emphasis effects may be selected from among the plurality of specified color emphasis tables by referring to the magnitude of the color emphasis effect.

Further, the first embodiment selects the specified color emphasis table and calculates the weight in which the specified color emphasis table is applied by analyzing the intermediate image data after the image correction, and thereby can perform a more accurate color emphasis processing.

Further, the first embodiment has a configuration first to generate the three-dimensional correction lookup table and to select the specified color emphasis table, and then to modify the three-dimensional correction lookup table. Thereby, the correction processing for an image having the original resolution may be performed once in the last step, and it is possible to generate the output image in efficient processing.

Second Embodiment

In the first embodiment, the image processing device first generates the reduced image data having a VGA size and calculates the white balance correction parameter and the gradation correction curve. Subsequently, the image processing device generates the intermediate image data by performing the basic corrections (white balance correction and the gradation correction) for the reduced image data, and selects a specified color emphasis table to be applied using the intermediate image data. The first embodiment with such a configuration has a point which can be improved as described below.

In the first embodiment, the reduced image data or the intermediate image data should be stored in the memory until the last part of the processing. When each R G B pixel is expressed in three bytes, a sum of the memory amount required even for the VGA size reduced image data becomes as large as 640×480×3=900 KB. This large amount of required memory is not a problem in the case of a personal computer or the like equipped with a large capacity memory of about several hundreds of megabytes. However, there is a problem in a case of a printer, digital camera, or the like, which is equipped with only a small capacity memory. Further, the first embodiment generates the three-dimensional correction lookup table after having calculated the white balance parameter and the gradation correction curve, and generates the intermediate image data by applying the three-dimensional correction lookup table to each pixel of the reduced image data. For an amount of computation required in generating the intermediate image data, about 300,000 (640×480×=307, 200) computations are required for the interpolation computation such as the tetrahedral interpolation, and 300,000×number of tables computations are required for calculating the amount of change for each pixel in selecting the specified color emphasis table. This large amount of computations is not a problem for a personal computer having a CPU operating with a several gigahertz clock, but there is a problem in the case of a printer, a digital camera, or the like, which operates with a clock of about several hundred megahertz.

Accordingly, a second embodiment eliminates the need to maintain a memory for continuing to store the intermediate image data. Further, the second embodiment provides an image processing device which reduces the amount of computation required in the intermediate image data generation.

The second embodiment calculates a grid histogram (GH) in the R G B space for the input image, and selects the specified color emphasis table using the grid histogram (GH) and the three-dimensional correction lookup table.

Figure 15:
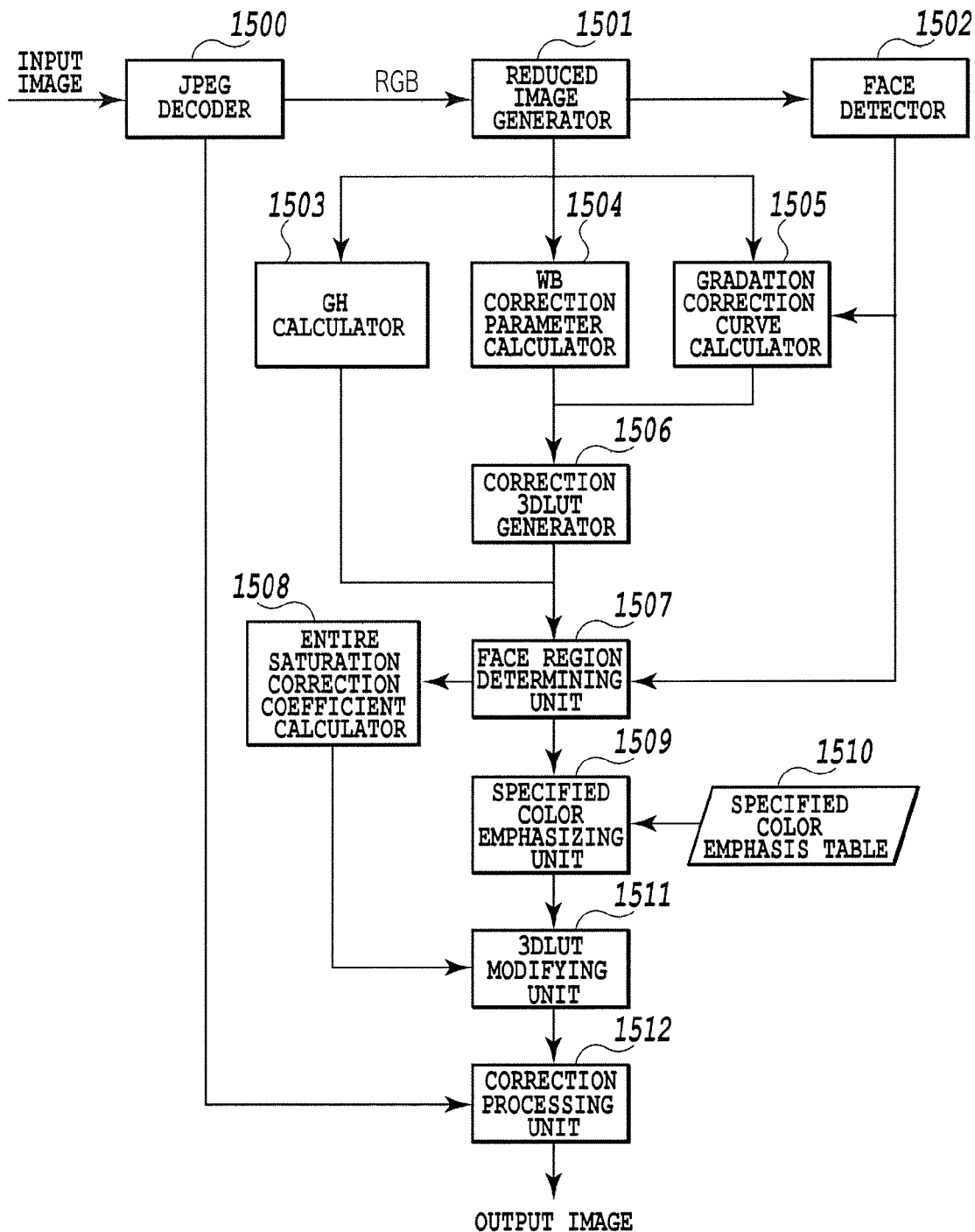
FIG. 15 is a block diagram showing a function of an image processing device in a second embodiment.

FIG. 15 is a block diagram showing a function of the image processing device in the second embodiment.

A configuration shown in FIG. 15 is different from that in FIG. 2 in that a grid histogram calculator 1503 is provided for calculating the grid histogram (GH) of the reduced image data and the intermediate image generator 206 is not provided.

First, the grid histogram (GH) will be described.

Figure 16:
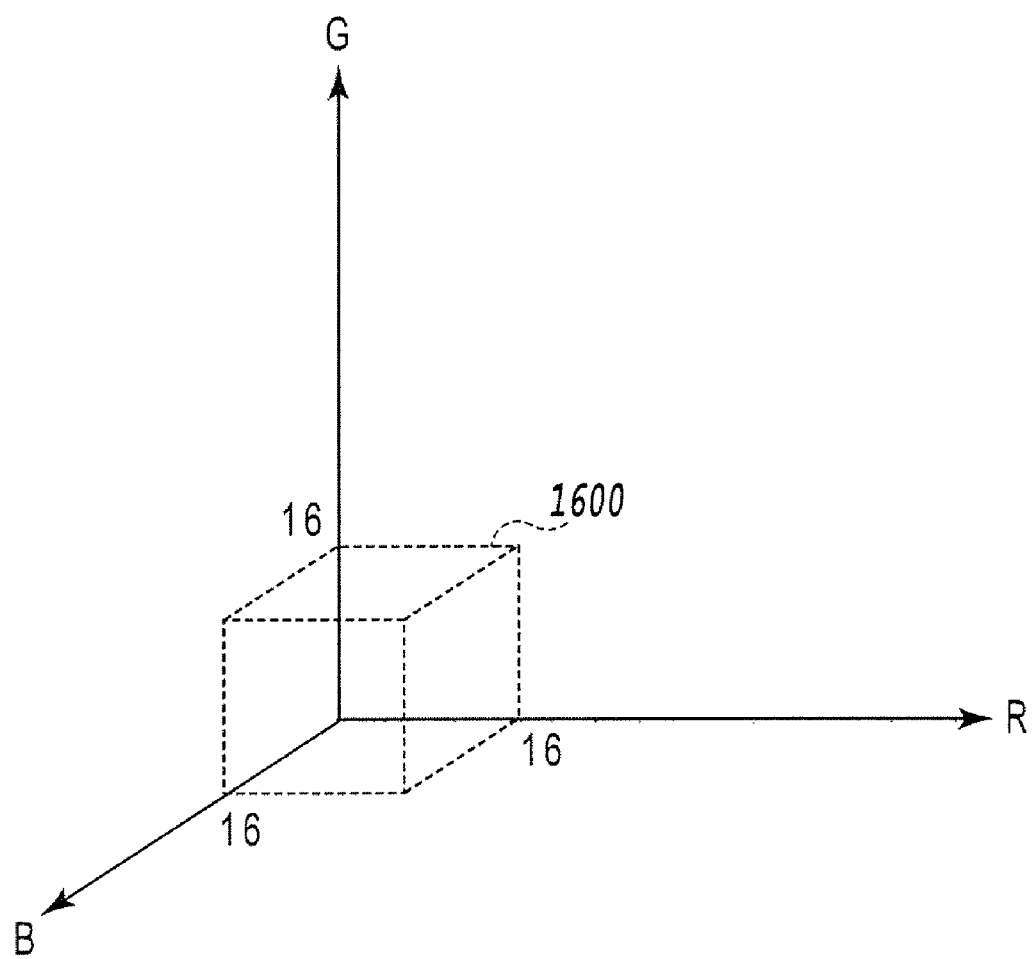
FIG. 16 is a diagram showing a multi-dimensional grid histogram (GH)

FIG. 16 is a diagram showing the multi-dimensional grid histogram (GH).

FIG. 16 shows the generation of grids at an interval of 16 in the three-dimensional space of 24 bit R G B, for example. In this case, the number of the grids (lattice points) in the three-dimensional space is $17^3$=4,913.

Figure 17:
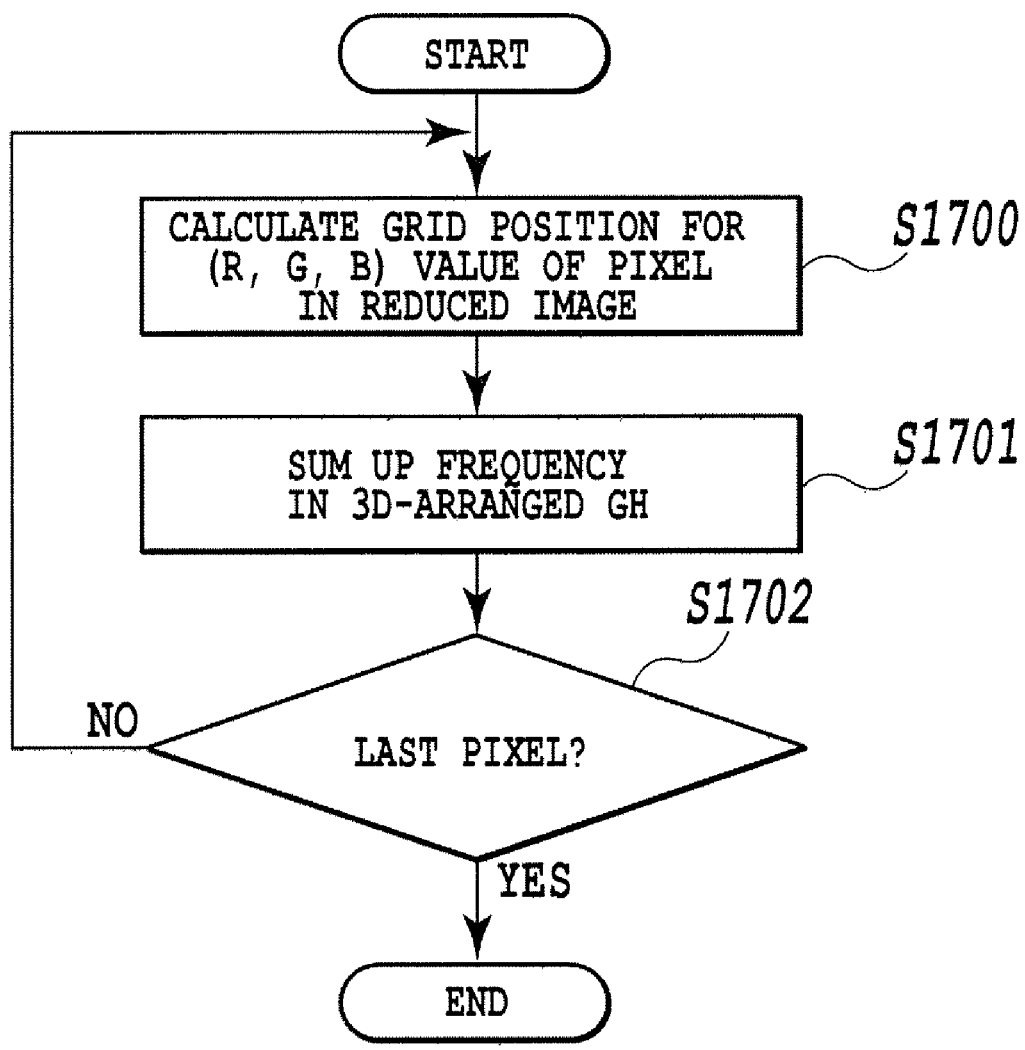
FIG. 17 is a flowchart showing a flow of grid histogram (GH) calculation processing on reduced image data.

FIG. 17 is a flowchart showing a processing flow for calculating the grid histogram (GH) of the reduced image data by the grid histogram calculator 1503.

In S1700, the grid histogram calculator 1503 calculates a grid position of the grid histogram for each pixel of the R G B reduced image data received from the reduced image data generator 1501. The calculation is performed as follows by use of a (R, G, B) value of each pixel.

$$G_R = \left\lfloor \frac{R+8}{16} \right\rfloor$$
$$G_G = \left\lfloor \frac{G+8}{16} \right\rfloor$$
$$G_B = \left\lfloor \frac{B+8}{16} \right\rfloor$$

Here, $G_R$, $G_G$, and $G_B$ show a grid position of the grid histogram (GH). According to the above formulas, if (R, G, B)=(16, 16, 16), the grid position is calculated as (1, 1, 1), for example.

In S1701, the grid histogram calculator 1503 sums up frequencies at the grid positions as in the following formula, using the three-dimensionally arranged grid histogram.

$$GH[G_R][G_G][G_B]=GH[G_R][G_G][G_B]+1$$

In S1702, the grid histogram calculator 1503 determines whether the processing in S1700 and S1701 was performed for all the pixels in the reduced image data.

The grid histogram calculator 1503 calculates the grid histogram by performing the processing in S1700 and S1701 for all the pixels in the reduced image data.

Note that the second embodiment converts the reduced image data from the Y Cb Cr data to the R G B data, and calculates the grid histogram in the R G B three-dimensional space, but the present invention is not limited to this method. For example, a three-dimensional grid may be configured in the Y Cb Cr space and the grid histogram may be calculated in the same manner, or the grid histogram may be calculated similarly in a C M Y K four-dimensional color space, for example.

Note that the calculation of the grid histogram in the R G B three-dimensional space in the second embodiment is superior to the calculation of the grid histogram in the Y Cb Cr space. The reason is as follows. There does not exist a pixel having both high luminance and high saturation such as (Y, Cb, Cr)=(255, 128, 128), for example, in typical image data. Therefore, there exist many grid positions having a frequency of zero in the Y Cb Cr space and the Y Cb Cr space can not be utilized efficiently. On the other hand, in the R G B three-dimensional space, the image data exists over the entire range from (R, G, B)=(255, 255, 255) to (R, G, B)=(0, 0, 0) and all the grid positions can be utilized efficiently. As a result, it is possible to analyze more detailed image information in the R G B three-dimensional space compared with the Y Cb Cr space. Accordingly, the second embodiment uses the R G B three-dimensional grid histogram.

The processing in the second embodiment will be described below with reference to FIG. 15 and FIG. 18. Note that only points different from the first embodiment will be described.

The specified color emphasizing unit 1509 receives the grid histogram from the grid histogram calculator 1503 and receives the three-dimensional correction lookup table from the three-dimensional correction lookup table generator 1506. When the face region determining unit 1507 has determined that the face region of a person exists in the image, the specified color emphasizing unit 1509 selects a specified color emphasis table using the grid histogram and the three-dimensional correction lookup table. Note that the second embodiment selects a specified color emphasis table without using the intermediate image data, since the second embodiment does not have the intermediate image generator differently from the first embodiment.

Figure 18:
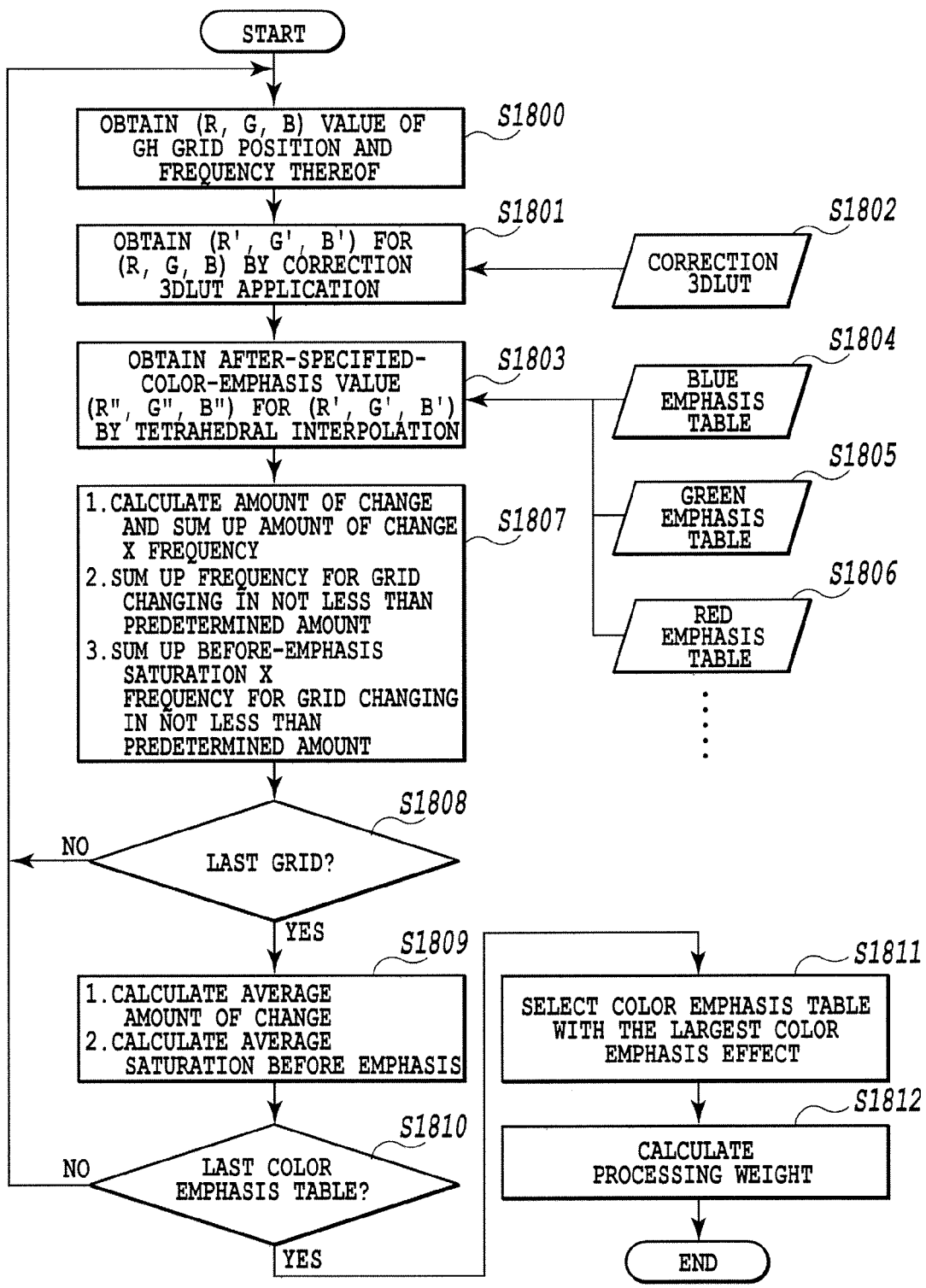
FIG. 18 is a flowchart showing a flow of specified color emphasis processing in the second embodiment.

FIG. 18 is a flowchart showing a flow of the specified color emphasis processing by the specified color emphasizing unit 1509.

In S1800, the specified color emphasizing unit 1509 obtains (R, G, B) which is each grid value of the grid histogram and a frequency at the grid.

In S1801, the specified color emphasizing unit 1509 applies the three-dimensional correction lookup table to (R, G, B) and obtains (R', G', B').

In S1803, the specified color emphasizing unit 1509 applies the blue emphasis table, for example, to the above (R', G', B') value using the publicly known interpolation method (tetrahedral interpolation or the like) and obtains (R", G", B") in which blue color is emphasized.

In S1807, the specified color emphasizing unit 1509 calculates the three parameters: 1. summed-up value of the amount of change, 2. the summed-up value of the frequency in the grid changing in not less than the predetermined amount, and 3. summed-up value of the saturation before color emphasis in the grid changing in not less than the predetermined amount.

First, the specified color emphasizing unit 1509 calculates the amount of change ΔD in colors of a grid before and after the application of the color emphasis table, using the following formula, when the blue emphasis table is applied.

$$\Delta D=\sqrt{(R'-R'')^2+(G'-G'')^2+(B'-B'')^2}$$

The summed-up value of the amount of change is obtained by summing up (above ΔD×frequency at a grid). In addition, the specified color emphasizing unit 1509 counts the number of pixels which have the amount of change ΔD not less than the predetermined value. Further, the specified color emphasizing unit 1509 sums up a saturation value of an original pixel value in the pixel which has the amount of change not less than the predetermined value. Note that the saturation of a pixel may be obtained by converting the grid value after the fundamental corrections (R', G', B') into a value in the HIS system, or the (R', G', B') value may be converted into a (Y, Cb, Cr) value and a length of a (Cb, Cr) vector may be summed up as a saturation value as follows.

$$S=\sqrt{(Cb)^2+(Cr)^2}$$

In S1808, the specified color emphasizing unit 1509 determines whether the processing in S1800 to S1807 for all the pixels in the intermediate image data has been performed, and, if the processing has been performed for all the pixels, the process goes to S1809.

In S1809, the specified color emphasizing unit 1509 calculates the average changed value and average saturation value by dividing the summed-up amount of change and saturation value by the number of pixels in the reduced image data.

The specified color emphasizing unit 1509 performs the processing in S1800 to S1809 using all the specified color emphasis tables. Thereby, the specified color emphasizing unit 1509 obtains the three parameters for each specified color emphasis table; the average changed value, the number of the pixels changing in not less than the predetermined amount, and the average saturation before the color emphasis of the pixels changing in not less than the predetermined amount.

The subsequent processing is the same as that in the first embodiment and description thereof will be omitted.

As described above, the second embodiment does not generate the intermediate image data and simulates an image state after the correction using the grid histogram (GH) in the R G B space and the three-dimensional correction lookup table. Then, the second embodiment selects a specified color emphasis table and calculates the application weight using the result. Therefore, the second embodiment does not need a large memory for continuing to store the intermediate image data. Further, while the first embodiment needs to perform about 600,000 interpolation computations for generating the intermediate image data, the second embodiment may perform only two interpolation computations for the grid histogram (GH) with 4,913 grids. That is, the second embodiment can select a specified color emphasizing table by performing about 10,000 interpolation computations in the same accuracy as that of the first embodiment.

Other Embodiments

While the above described embodiments use the R G B three-dimensional correction lookup table, a three-dimensional correction lookup table of a luminance-color difference signal (Y Cb Cr, Y C1 C2, L*a*b*, etc.) or a three-or-more-dimensional lookup table of C M Y K or the like may be used.

Further, an example of the object, the color of which is not to be changed, is a face of a person in the embodiments described above, the object may be another specified object such as an animal and a flower.

Further, the above described embodiments select only one table which has the largest color emphasis effect, that is, the largest amount of change from among the plurality of specified color emphasis tables. However, there may be a configuration to select a plurality of tables which have the large amount of change and to make the three-dimensional correction lookup table modifying unit apply the tables sequentially.

Further, in the above described embodiments, a larger area increases weight and there is a case in which the color emphasis effect becomes too outstanding. Therefore, there may be a configuration to reduce the application weight of the specified color emphasis table as the area increases, for example, as follows.

$$W = W0 \times (1.0 - W1) \times W2$$

Further, for limiting a magnitude of the color emphasis effect, the application weight parameters W0, W1, and W2, and further the final application weight W may have upper limits.

Further, the present invention may be applied to a system comprising a plurality of devices (e.g., host computer, interface device, reader, printer, etc.) or may be applied to a device composed of a single device (e.g., copy machine, facsimile, etc.).

An object of the present invention can be achieved also by mounting a recording medium, which records a software program code to achieve the function of the foregoing embodiments, to a system or a device, and by causing a computer in the system or the like to read and execute the program code stored in the recording medium. In this case, the program code itself, read from the recording medium, achieves the function of the foregoing embodiments and the recording medium recording the program code constitutes the present invention. The recording medium is a computer-readable recording medium. Further, an operating system (OS) or the like, operating on a computer according to instructions of the program code, may perform a part of or the entire actual processing and may realize the function of the foregoing embodiment by the processing. Further, after the program code read from the recording medium has been written into a function extension card or a function extension unit, the function extension card or the like may perform a part of or the entire processing according to the instructions of the program code to realize the foregoing embodiments.

When the present invention is applied to the above recording medium, the recording medium stores program codes corresponding to the flowcharts described hereinabove.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199491, filed Jul. 31, 2007, which is hereby incorporated by reference herein in its entirety.

What is claimed is:

1. An image processing device, comprising:
   a determining component configured to determine whether or not a predetermined object exists in an image; and
   a correction component configured to correct a specified color except for a color of the predetermined object in the image in a case where it is determined by the determining component that the predetermined object exists in the image, and to correct saturation of the image in a case where it is determined by the determining component that the predetermined object does not exist in the image.

2. The image processing device of claim 1, wherein the predetermined object is a face.

3. The image processing device of claim 1, wherein said correction component corrects the specified color using specified color emphasis tables to emphasize the specified color.

4. The image processing device of claim 1, wherein the specified color is at least one of blue, red and green.

5. An image processing method, comprising the steps of:
   determining whether or not a predetermined object exists in an image; and
   correcting a specified color except for a color of the predetermined object in the image in a case where it is determined by the determining step that the predetermined object exists in the image, and correcting saturation of the image in a case where it is determined by the determining step that the predetermined object does not exist in the image.

6. A non-transitory computer-readable recording medium having computer-executable instructions for performing an image processing method, the method comprising the steps of:

determining whether or not a predetermined object exists in an image; and correcting a specified color except for a color of the predetermined object in the image in a case where it is determined by the determining step that the predetermined object exists in the image, and correcting saturation of the image in a case where it is determined by the determining step that the predetermined object does not exist in the image.

* * * * *